United States Patent
Chen (10) Patent No.: US 6,456,633 B1
(45) Date of Patent: Sep. 24, 2002

(54) UNIFIED DISTRIBUTED VOICE AND DATA LOCAL AREA NETWORKING

(75) Inventor: Abraham Y. Chen, Mountain View, CA (US)

(73) Assignee: Avinta Communications, Inc., Mountain View, CA (US)

( * ) Notice: Subject to any disclaimer, the term of this patent is extended or adjusted under 35 U.S.C. 154(b) by 0 days.

(21) Appl. No.: 09/288,421

(22) Filed: Apr. 8, 1999

(51) Int. Cl.[7] .................................................. H04J 3/12
(52) U.S. Cl. ...................................... 370/490; 370/352
(58) Field of Search ................................ 370/276, 319, 370/431, 490, 449, 522, 352, 359, 364

(56) References Cited

U.S. PATENT DOCUMENTS

| | | | | |
|---|---|---|---|---|
| 4,403,322 A | * | 9/1983 | Kato et al. ................... | 370/522 |
| 4,512,013 A | * | 4/1985 | Nash et al. ................... | 370/493 |
| 5,420,852 A | * | 5/1995 | Anderson et al. ............ | 370/364 |
| 5,440,544 A | * | 8/1995 | Zinser, Jr. .................... | 370/319 |
| 6,021,119 A | * | 2/2000 | Derks et al. ................. | 370/276 |
| 6,154,465 A | * | 11/2000 | Pickett ......................... | 370/490 |
| 6,289,018 B1 | * | 9/2001 | Song ............................ | 370/359 |
| 6,400,708 B1 | * | 6/2002 | Bartholomew et al. ..... | 370/352 |

* cited by examiner

Primary Examiner—Salvatore Cangialosi (57) ABSTRACT

A local networking system, offers integrated communication services to multiple local voice stations and data terminals via a common transmission medium. This system, utilizing Frequency Division Multiplexing (FDM) signals as carrier, transports information with CSMA/CD protocol. Voice transmissions are organized in traditional TDMA format with fixed frame length and dynamically assigned time slots to avoid interference caused by other devices in the system. Data services operate in traditional CSMA/CD format, but restricted to specified blocks of time intervals. The voice service quality is guaranteed because the required channels and bandwidths, up to the designed maximum, are always available when needed. The grade of data service may be impacted by voice traffic volume which is automatically managed by data terminal's inherent design with CSMA/CD protocol. This unified digital multiplexing system is applicable to transmission media with restricted channels. For example, even with very limited transmission bandwidth, a Dual Area Network (DAN) for integrated voice and data transmissions still can be set up on power or telephone line. On the other hand, this technique can maximize channel utilization of any given bandwidth in a wide band transmission facility, such as radio wave, coaxial cable or infrared system.

20 Claims, 7 Drawing Sheets

UNIFIED DISTRIBUTED VOICE AND DATA LOCAL AREA NETWORKING

TECHNICAL FIELD

This invention relates to on-premise voice and data communication systems.

BACKGROUND OF THE INVENTION

The most natural form of human communication is by voice. Besides face-to-face conversations, telephone has been providing the inter-connections between parties at different locations and times. The original direct connections quickly gave way to the switching systems provided by telephone companies, which have evolved to be the most flexible routing facilities for modern communication.

As the capabilities of the station instruments diversified and the subscriber's applications grew more sophisticated, additional routing locally became very desirable. Private Automatic Branch exchange (PABX) switching machines satisfied this need in business environment by assigning each station an "extension number". Connections are then set up with direct wirings from the PABX's central switching unit, very much like the telephone company configuration.

A major hurdle in deploying PABX capabilities to residential or small office settings is that the wiring in these premises is very limited. For example, the existing wiring in many residential settings is limited to one pair. Adding new wiring for the purpose of service expansion discourages most of the would-be customers.

U.S. Pat. No. 5,596,631 resolved this limitation by introducing a station controller module that performs PABX functions with distributed architecture on single telephone line. It provides the routing capabilities of a PABX without requiring any addition or modification to the existing wiring. The basic architecture could be replicated for multi-line configurations. However, for a premise that was originally set up with a single pair of telephone wires, expanding to multiple line distributed PABX service would encounter the wiring limitation again.

Multiplexing voice traffic by digital technology to reduce facility requirement has been practiced for quite some time. Normally, it is set up for long distance transmission over dedicated facility that is well maintained by trained professionals. Such technology is not suited for customer premise environment whereby distance is fairly limited, while the wiring is characterized by random topology with wide range of medium quality. And, "plug and play", "no maintenance" are key product requirements.

In recent years, the fast proliferation of Personal Computers (PCs) in workplaces, has created a similar need among the data equipments. Local Area Network (LAN) has been deployed to meet such demand. However, since LAN technology was developed primarily for business applications, its operation principles does not suit very well for residential situations, either.

The lately available Home Phoneline Networking (HPN—U.S. Pat. No. 5,696,790) technology capable of transmitting high speed digital signal over a single pair of traditional on-premise telephone wiring has made residential level LAN service feasible. By utilizing existing on-premise telephone wiring as transmission medium, a digital data bus can be established among communication nodes equipped with HPN technology based interface modules.

Although HPN provides data communication among multiple PCs, it does not address the voice communication need among PC's human operators. This is due to the fundamental differences between voice and data communications:

Connections for human voice conversation are only established on demand. Dedicated facility is used and consistent service quality has to be maintained throughout a session. For example, it would not tolerate any degradation such as noise caused by random time delay in transmission.

Physical connections among data equipments, on the other hand, are continuously maintained even if there is no information to transmit. All terminals are constantly monitoring the communication medium. Information is broadcasted whenever any terminal has message to sent. Since there is no overall system coordination, collisions among data terminals are expected as a norm. Consequently, system throughput degrades proportional to traffic. However, such degradation due to collision can be tolerated by users because there is no definitive expectation of data transmission speed. Since data equipment is designed to transmit information in packets, it can easily deal with the need of re-transmission when a packet is not received by the destination party. It is clear that even HPN technology is still not compatible with voice communication requirements.

It is therefore the objectives of this invention to present a methodology of extending the single line distributed PABX concept to a multi-line service, to combine with data LAN operation so that a unified local area network is formed, while staying within the restrictions of limited physical interconnect facility.

Another goal of this invention is to maximize system performance by dynamic resource allocation between voice and data communications according to the usage.

Yet another objective of this disclosure is to maintain an interconnect system that is physically modular, so that it does not require special knowledge and skill to set up and to operate.

SUMMARY OF THE INVENTION

This document discloses a novel local communication system that is based on Frequency Division Multiplexing (FDM) technology to share the same physical medium with the external wide area communication service. The local system itself utilizes digital Time Division Multiplexing (TDM) technique to integrate two types of signals, voice conversations transported by Time Division Multiple Access (TDMA) protocol and data messages transported by Carrier Sense Multiple Access with Collision Detection (CSMA/CD) protocol, into one unified local network.

The TDM technology transports voice traffic in an orderly designated time slot fashion. However, all time slots in a traditional TDM system are continuously "used" even when there is no traffic to carry. If such "empty" time slots are consolidated into one block of contiguous time interval, it is then possible to allocate it to data terminals which operate in on-demand random-access, and collision-avoidance mode. This operation architecture can therefore merge both voice and data applications into one uniform system with dynamic resource allocation. In other words, this is a communication system that its primary goal is to provide voice communication. Under such a precondition, the system would constantly allocate as much resources for data terminals as available.

One basic application for this methodology is to establish simultaneous voice PABX and data LAN services in residential and SOHO (Small Office Home Office) environments where very limited transmission facility, such as one single pair of telephone wires, has been hindering the deployment of modern communication services.

HPN technology is used as an example vehicle to demonstrate how to extend multi-line telephone company services to individual stations, to establish intercom among the stations, and to provide data networking among computing terminals, all on a single pair of telephone wires. Thus, the connection medium needed in a multi-line PABX based on U.S. Pat. No. 5,596,631 can be reduced back to only one physical cable. Simultaneously, the data terminals perform their services by utilizing the remaining resources not occupied by voice traffic.

One of the advantages of the present invention is that the size of the system would be rather flexible. When all telephone services are in standby state, the entire system resources can be used for data networking. At the other extreme, the system could be fully loaded with voice traffic, while the data traffic is slowed down for the corresponding duration of time. By setting a limit on the maximum number of simultaneous voice channels allowed, minimum data networking speed is guaranteed, while the voice traffic may experience congestions during peak usage. So, this system will be suitable for a wide range of situations, from isolated island of local intercom with or without data networking, single line residential home, through SOHO, to well established small business.

Conventional digitized voice requires 64 Kb/s (Kilo-bits per second) digital signal to represent. The HPN technology is currently offering 1 Mb/s (Mega-bits per second) data throughput. Therefore, it is capable of carrying traffic of about 15 talkers (or, over 7 pairs of conversations). With the projected 10 Mb/s and even faster transmission speed in the next generation HPN devices, several tens of voice conversations and a large number of data terminals can share one single pair of telephone line.

On the other hand, if compression techniques are applied to speech signals, the portion of the system time required by voice traffic can be reduced correspondingly. Therefore, higher percentage of system resources will be available for data transmission.

DESCRIPTION OF THE PREFERRED EMBODIMENT

Figure 1:
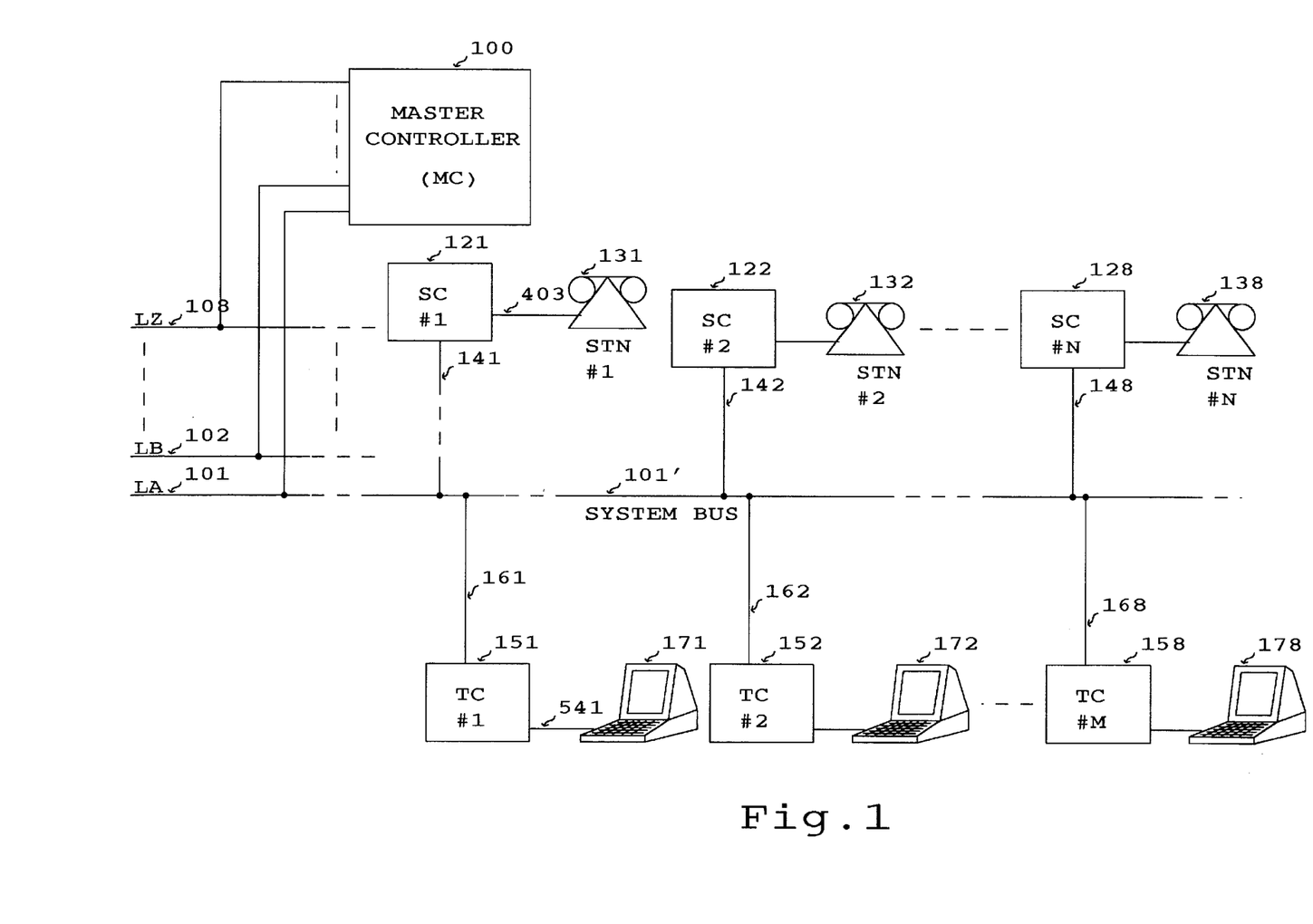
FIG. 1 is a block diagram showing the concept of a Master Controller interfacing external communication service lines LA, LB, . . . LZ to Station Controllers (SCs), and to data Terminal Controllers (TCs) via a common System Bus 101' such that a Dual (voice and data) local Area Network (DAN) with unified system architecture is formed.

FIG. 1 is an illustrative system configuration of my invention. LA (101), LB (102), . . . LZ (108) represent the traditional service lines from telephone company (not shown). The services available on them are monitored by Master Controller (MC) 100, which digitizes these signals (DC to 4 KHz of Plain Old Telephone Service—POTS), multiplexes and puts them onto System Bus 101' (described below) at a different frequency (5 to 10 MHz of Home Phoneline Networking—HPN). Note that telephone company line 101 and System Bus 101' are physically continuous. Yet, based on the principle of Frequency Division Multiplexing (FDM), these two signals can co-exist on the same line and operate totally independent of each other, as if the other does not exist. Due to the high frequency characteristics, the HPN signals do not propagate too far onto line 101. Thus, a "prime" symbol is used to signify the fact that the System Bus 101' is carrying signals locally in addition to those on telephone company line LA 101.

The information transmission among all nodes (MC, SCs and TCs) is handled by HPN technology. All nodes listen to the signal on the System Bus 101' continuously for the portions that are relevant to itself. On the other hand, each node puts signal on System bus 101' at the proper time slot assigned to it (described below).

The Station Controllers SC#1 (121), SC#2 (122), . . . SC#N (128), connect to System Bus 101' via signal lines 141, 142, . . . 148, respectively, and convert signals in assigned time slots to telephone station instruments STN#1 131, STN#2 132, . . . STN#N 138, respectively. The physical connections among signal lines 141, 142, . . . 148 and System Bus 101' could be different lengths of wires and random topology as the dotted lines imply.

Based on traditional Pulse Code Modulation (PCM) technology, a 64 Kb/s digital signal stream is needed to transmit one speech. A telephone conversation normally consists of two talkers which requires 128 Kb/s to represent. For three conversations, it would need a 384 Kb/s digital stream to carry. If the System Bus 101' is capable of 1 Mb/s, such as the current HPN technology can provide, there will be 616 Kb/s information carrying capability left over for communication needs among data equipments.

This opens up the opportunity of utilizing Terminal Controllers TC#1 151, TC#2 152, . . . TC#M 158 to interface data terminal equipments 171, 172, . . . 178 to System Bus 101' via line 161, 162, . . . 168, respectively.

Essentially, the SCs 121, 122, . . . 128 work with MC 100 through System Bus 101' to provide full telephone service available from the telephone company via lines 101, 102, . . . 108, respectively, while the TCs 151, 152, . . . 158 perform data networking service by utilizing the remaining transmission capacity of the System Bus 101'.

For simplicity, a single "Telephone" symbol is used for all voice type station instruments at 131, 132, . . . 138 which could be a telephone set, Telephone Answering Devices (TAD), or facsimile (FAX), etc.

Similarly, "Computer" is a representative symbol for various data processing equipments 171, 172, . . . 178, such as a Personal Computer (PC), printer, scanner, modem, or digital camera, etc.

Each one of the SCs 121, 122, . . . 128 and STNs 131, 132, . . . 138 of the present invention is equivalent to those SCs 121, 122, . . . 128, and STNs 131, 132, . . . 138, respectively as disclosed in U.S. Pat. No. 5,596,631. The current System Bus 101' is equivalent to line 101 of the prior art with the added function of carrying multiplexed voice signals. This puts multiple telephone services on the same line offering each SC the added capability to access more than one telephone service line. For conciseness, each pair of wires in FIG. 1 of U.S. Pat. No. 5,596,631 is depicted as one line in the present FIG. 1.

Figure 2:
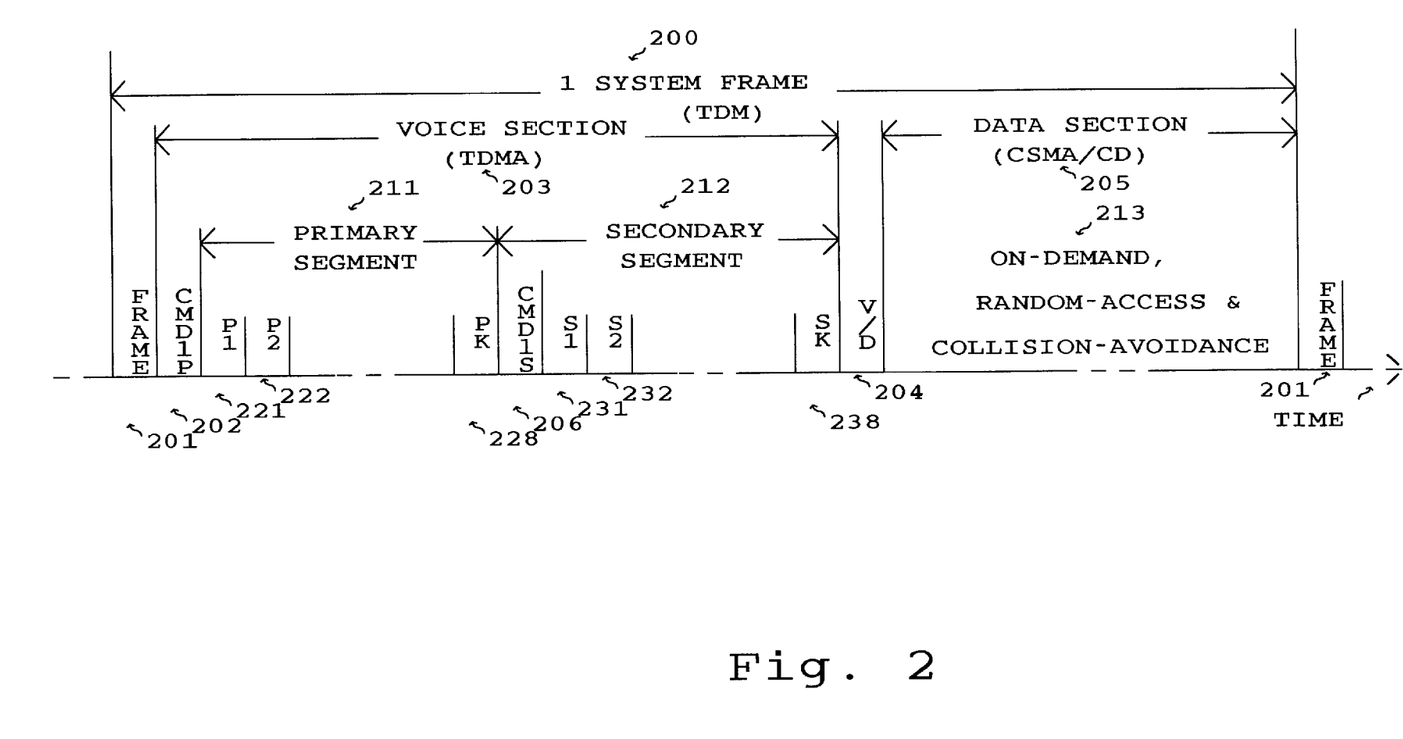
FIG. 2 is a timing diagram showing the system concept of the DAN that transports individualized voice connection in respectively assigned time slots, and broadcasts data messages within a shared block of time interval among all data terminals.

FIG. 2 is an operation timing diagram of an unified distributed local area network showing one System Frame 200 of a Time Division Multiplex (TDM) operation. Each System Frame 200 is then sub-divided into two Sections which are dynamically adjusted according to usage:

A. The first Section 203 is for voice transmission, which operates according to conventional Time Division Multiple Access (TDMA) techniques (For example, ALOHA, U.S. Pat. No. 5,515,379).

B. The second Section 205 is for data transmission, which follows the operation method of Carrier Sense Multiple Access with Collision Detection (CSMA/CD) technology. (For example, LAN, ISO 8802-3)

The Voice Section 203 is further divided into Primary 211 and Secondary 212 time segments, and each node of a party in a conversation is assigned a specific time slot for transmitting its information. That is, the MC 100 utilizes time slots P1 221, P2 222, . . . PK 228 to transmit information from the active lines among telephone company lines LA 101, LB 102, . . . LZ 108. And, the active Station Controllers among SCs 121, 122, . . . 128 are each assigned a corresponding time slot among S1 231, S2 232, . . . SK 238 to transmit information from corresponding STNs 131, 132, . . . 138. To coordinate the assignment of time slots, setup and take-down of a link for conversation, time slots CMD-P 202 and CMD-S 206 are used for the MC 100 and SCs 121, 122, . . . 128 to exchange status information, to make request and response for service from the others, respectively. These processes are commonly known in the art (for example, digital carrier systems such as North America T1, and and European E1), and therefore not detailed here.

The Data Section 205 is open to whoever among all TCs 151, 152, . . . 158 with message to transmit. The data terminals operate in an on-demand, random-access and collision-avoidance mode (213). That is, TCs 151, 152, . . . 158 compete for a position to transmit messages from their corresponding data terminals 171, 172, . . . 178, according to the well known LAN protocols.

The parameter "K" in time slot "PK" and "SK" is determined by the number of conversation pairs among external lines and internal SCs that are actively engaged in communication. For each value of "K", the duration for Voice Section 203 is determined. Subtracting Voice Section 203 from the fixed length of a System Frame 200, the Data Section 205 is derived. In other words, the effective capacity available to data communication is controlled by the number of active conversations. Since all T/Rs of MC, SCs and TCs are constantly listening to signals on System Bus 101', this information is received by all to coordinate the individual's activity relative to the others through System Bus 101'.

A Frame flag 201 is used to set the reference for one system time cycle. A Voice/Data separation flag V/D 204 is used at the end of the Secondary voice segment 212. That is, the TCs 151, 152, . . . 158 are pre-programmed to recognize that the system resources allocated to data communication within each frame 200 are restricted to the duration after the V/D flag 204. Since the system timing is known to all node controllers, V/D could be as simple as a length of guard time.

Figure 3:
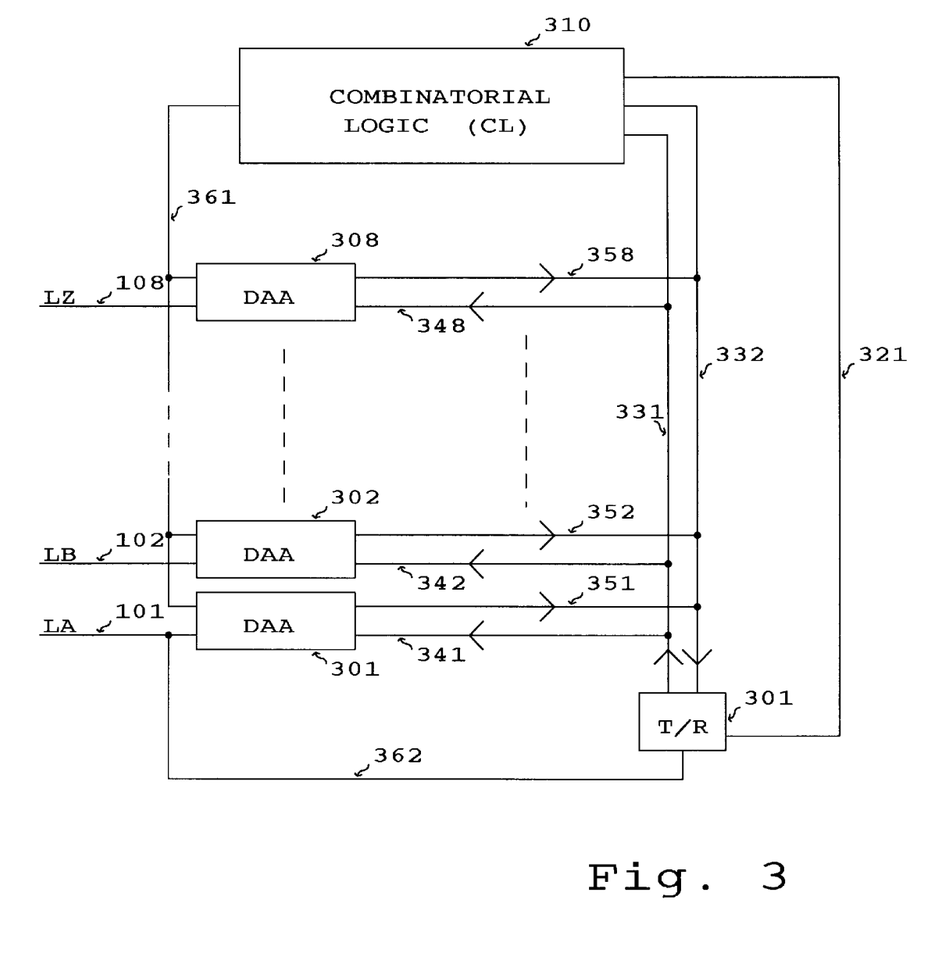
FIG. 3 depicts the architecture of a Master Controller interfacing external service lines LA, LB, . . . LZ via Direct Access Arrangement (DAA) to an internal data bus pair which transmits to and receives from System Bus via transceiver T/R. The operation timing is controlled by Combinatorial Logic.

FIG. 3 is a block diagram of MC 100. It consists of the well known telephone line interface subsystem, Direct Access Arrangements (DAA) 301, 302, . . . 308, each interfaces one of the analog external service lines LA 101, LB 102, . . . LZ 108 to the internal digital data bus 332 via lines 351, 352, . . . 358, respectively. The HPN technology transceiver (T/R) 301, under the control of Combinatorial Logic (CL) 310 via command line 321, transmits information on data bus 332 to line 362 which is connected to System Bus 101' via LA 101. T/R 301 also monitors line 362 for desirable signals as determined by CL 310, and puts them on line 331 destined for one of the DAAs 301, 302, . . . 308 via lines 341, 342, . . . 348, respectively, which will be transmitted toward one of the corresponding external service lines LA 101, LB 102, . . . LZ 108. Command line 361 is used for exchange status and command related messages such as ringing detect reports from DAAs to CL 310, On/Off-hook commands from CL 310 to DAAs. These are common activities in telephone connection setup process known in the art, and therefore not detailed here.

CL 310 also sends out Frame signal 201, via signal line 332 through T/R 301 to System Bus 101', to synchronize the operation of the entire system. This signal also prevents the data Terminal Controllers (described below) from occupying the entire system time.

Furthermore, CL 310 receives service requests from Station Controllers 121, 122, . . . 128 (described below) in time slot CMD-S 206 via line 331, and assign time slots for voice traffic by CMD-P 202 via line 332.

Figure 4:
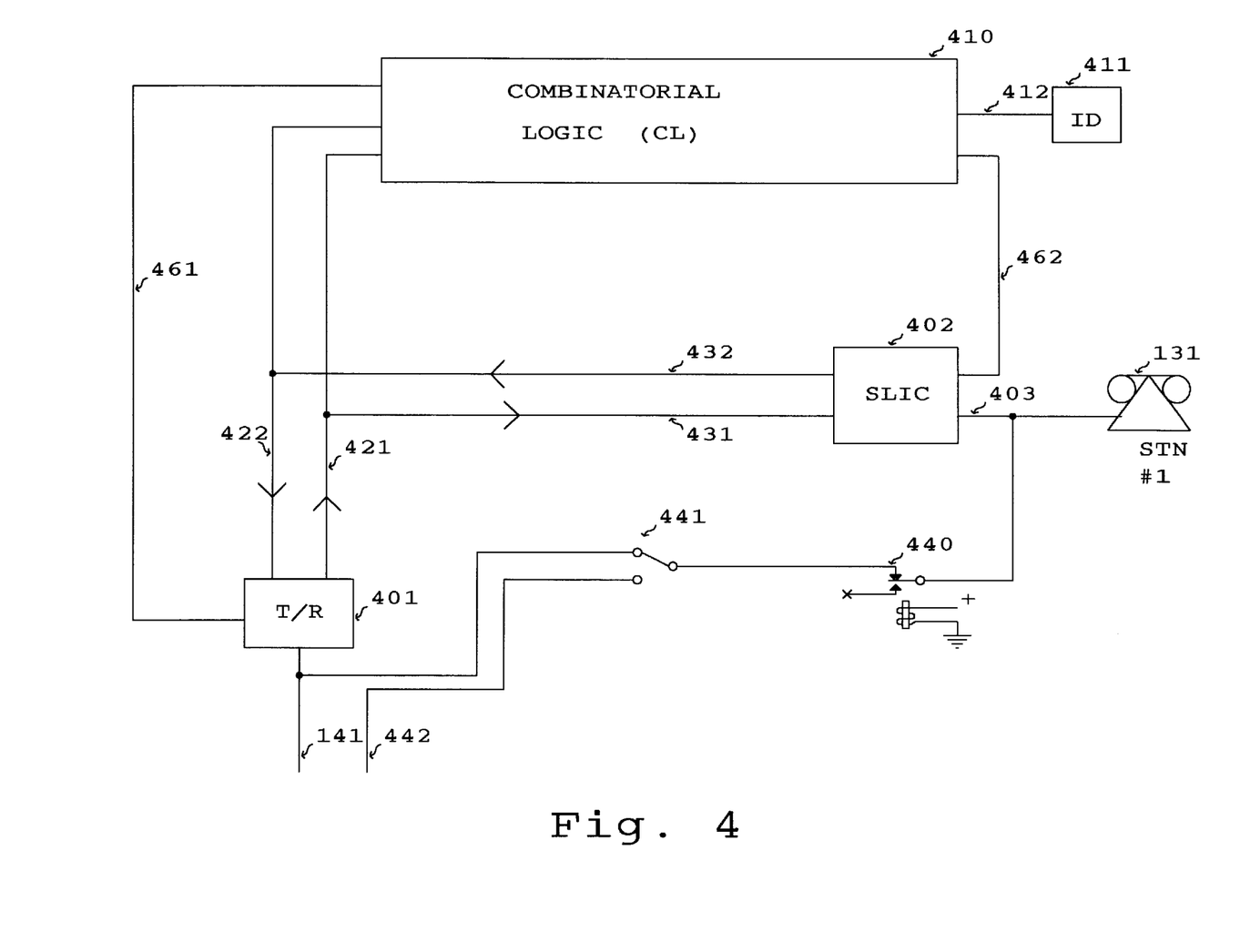
FIG. 4 depicts the architecture of a Station Controller interfacing station service line via Subscriber Line Interface Circuit (SLIC) to an internal data bus pair which transmits to and receives from System Bus via transceiver T/R. The operation timing is controller by Combinatorial Logic.

FIG. 4 is a block diagram of one of the voice Station Controllers, SC#1 121. The construction of its transceiver T/R module 401 is identical to that of T/R 301 in MC 100. T/R 401, under the control of Combinatorial Logic (CL) 410 via command line 461, interfaces signals on line 141 which is connected with System Bus 101', to internal digital data bus 421 and 422. Such signals are connected to and from conventional Subscriber Line Interface Circuit (SLIC) 402 via lines 431 and 432, respectively. SLIC 402 converts digital signals to analog signals with the same characteristics as Plain Old Telephone Service (POTS) to station instrument STN#1 131 connected on line 403. Command line 462 is used by SLIC 402 to report STN #1 131 status such as station set ON/OFF-hook, and by CL 410 to send "ringing enable" command to SLIC 402, etc. These are common telephony operations that are well known in the art, and therefore, not detailed here.

To operate the station instruments 131, 132, . . . 138 as "extensions" in a PABX, an unique address has to be assigned to each SC. This is achieved through the use of dial switch ID 411. The setting on it is fed into CL 410 via signal line 412. When a call setup request is received on line 421, CL 410 compares the destination address message against that on ID 411. If a match is found, CL 410 responds by sending an answer message via line 422 to receive the call.

Figure 5:
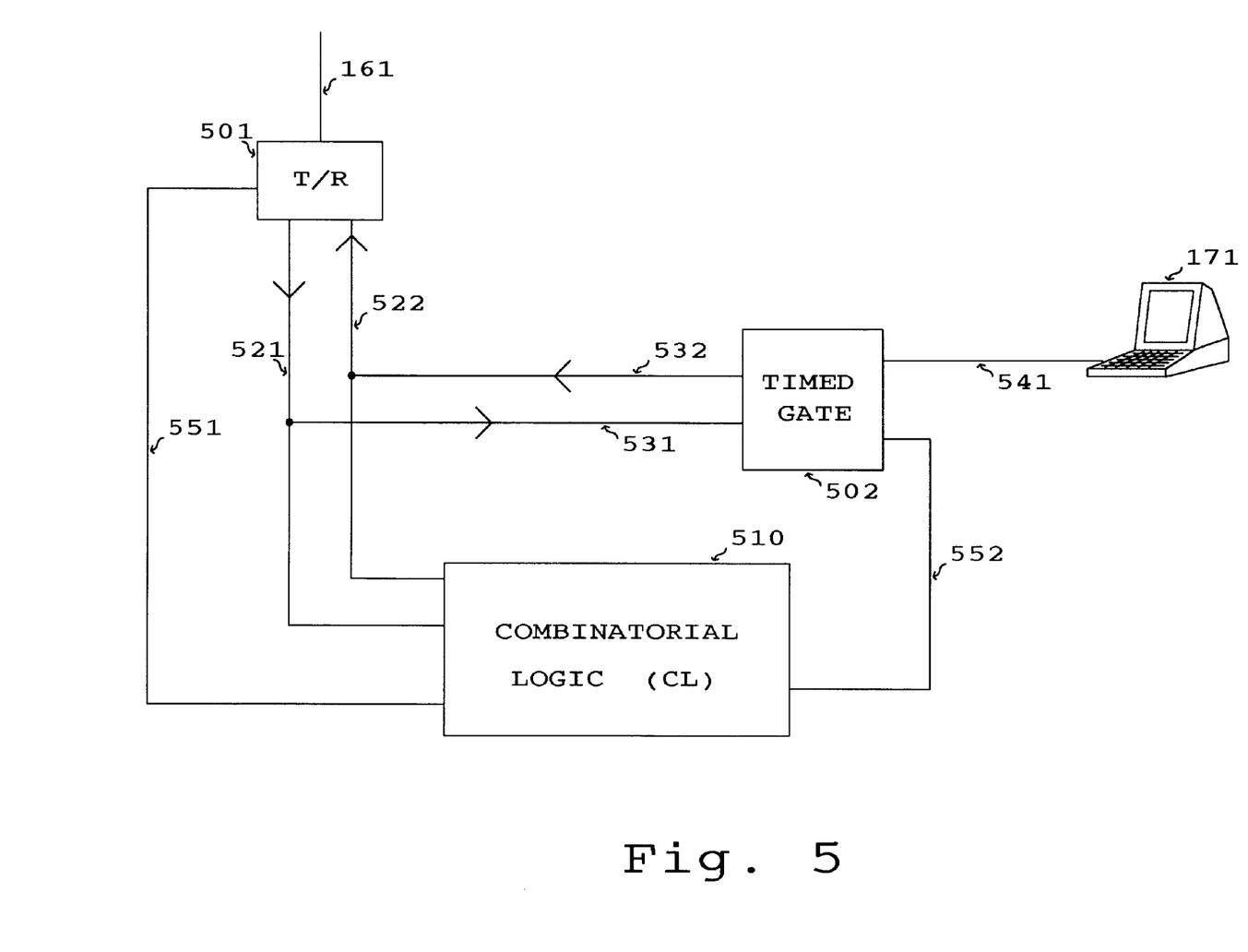
FIG. 5 depicts the architecture of a Terminal Controller interfacing data equipment signals via TIMED GATE to an internal data bus pair, which transmits to and receives from System Bus via transceiver T/R. The operation timing is controlled by Combinatorial Logic.

FIG. 5 is a block diagram of one of the data Terminal Controllers, TC#1 151. Again, transceiver T/R 501 has identical construction as 301 of MC 100, or 401 of SC#1 121. T/R 501, under the control of Combinatorial Logic (CL) 510, via command line 551, interfaces signals on line 161 which is connected with System Bus 101', to internal data bus 521 and 522. Such signals are connected to Timed Gate 502 via lines 531 and 532, respectively. The Timed Gate 502, under the control of CL 510 via command line 552 buffers signals to and from data terminal equipment 171 connected on line 541. There could be various industrial standard interface formats on line 541. These range from the traditional serial (RS232), parallel (Centronics), to USB (Universal Serial Bus), etc. Although they possess different characteristics and data speed, their functions are the same and are commonly known in the art. Thus, they are not discussed here.

Although transceivers T/R 301, 401, and 501 of MC 100, SC 121 and TC 151, respectively, are constructed from HPN technology which operates in CSMA/CD mode, T/R 301 and 401 operate only during respectively assigned time slots when no other T/R unit is allowed to transmit according to the system timing plan shown in FIG. 2. Thus, the CS (Carrier Sensing) and CD (Collision Detection) capabilities in T/R 301 and 401 are not utilized. Under normal operation conditions, information sent out from these modules are expected to be single transmission without any interruptions. There is no need to consider re-transmission. On the other hand, although T/R 501 handles data traffic in its inherent CSMA/CD mode, it is turned on by CL 510 only during Data Section 205 of each System Frame 200. This layer of operation logic makes the present invention realistic.

Figure 6:
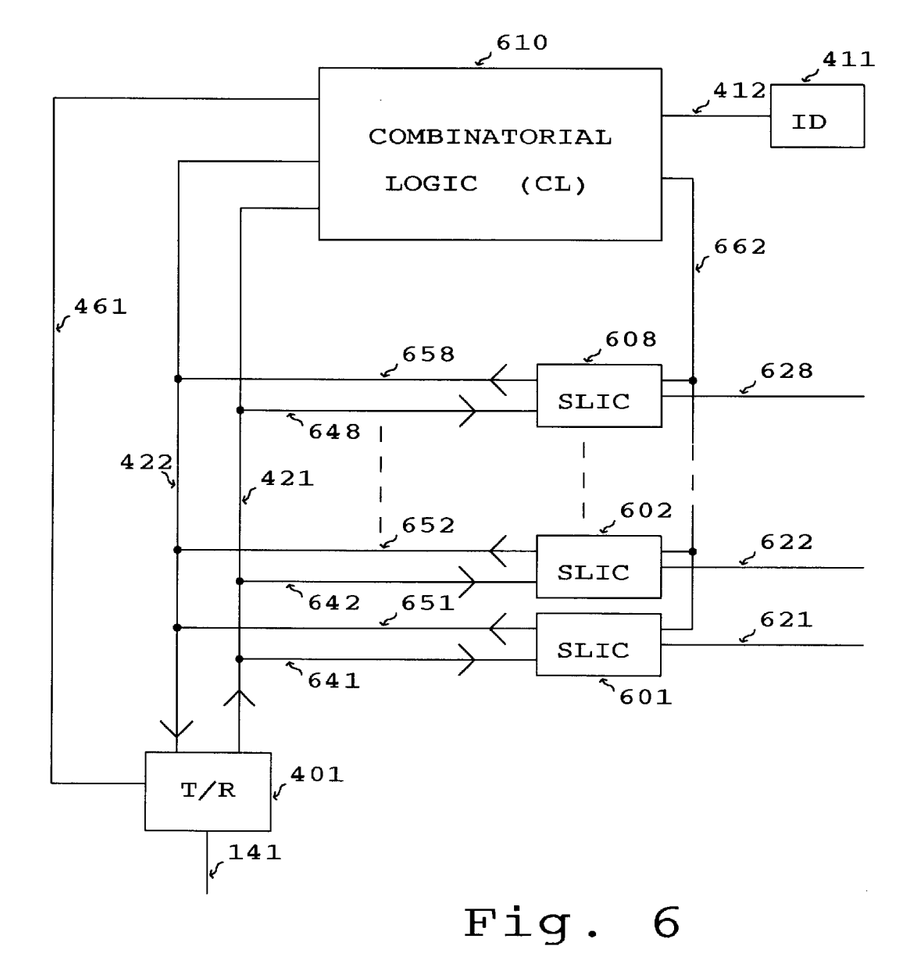
FIG. 6 shows that the architecture of FIG. 4 can be expanded by multiple SLICs for extending multiple line service to multi-line telephone instrument.

FIG. 6 is a block diagram of a SC that is made of multiple SLICs from FIG. 4. Like elements to those in FIG. 4 have the same reference numbers. Each of the SLICs 601, 602, . . . 608 is operated under the control of Combinatorial Logic (CL) 610 via command line 662 at an assigned time slot to provide one channel of standard POTS service. T/R 401 controlled by CL 610 via command line 461 interfaces System Bus 101' via line 141 to internal bus 421 and 422 which provides demultiplexing and multiplexing functions to signal lines 641, 642, . . . 648 and 651, 652, . . . 658 that are connected to SLICs 601, 602, . . . 608, respectively. Compared to CL 410, CL 610 possesses multiple copies of CL 410 logic and is capable to execute them simultaneously, when needed. Thus, a conventional multi-line telephone set, or a Key Telephone Set (KTS) may be used with lines 621, 622, . . . 628. For example, if only two SLICs are used, FIG. 6 would represent a station controller for the popular "2-Line phone".

A closer study of FIG. 6 reveals that SLICs 601, 602, . . . 608 are likely be used for somewhat related voice conversations of the same subscriber on station lines 621, 622, . . . 628. Thus, the physical devices SLICs 601, 602, . . . 608 could be merged into one and used at multiple time slots within each System Frame 200. That is, common station instrument functions such as "hold", "conference" could be implemented by enhancing the combinatorial logic in CL 610. Consequently, single line station instrument can be used. Essentially, the distributed SCs of my invention can extend multi-line services that were implemented in the central control unit of traditional PABX.

Figure 7:
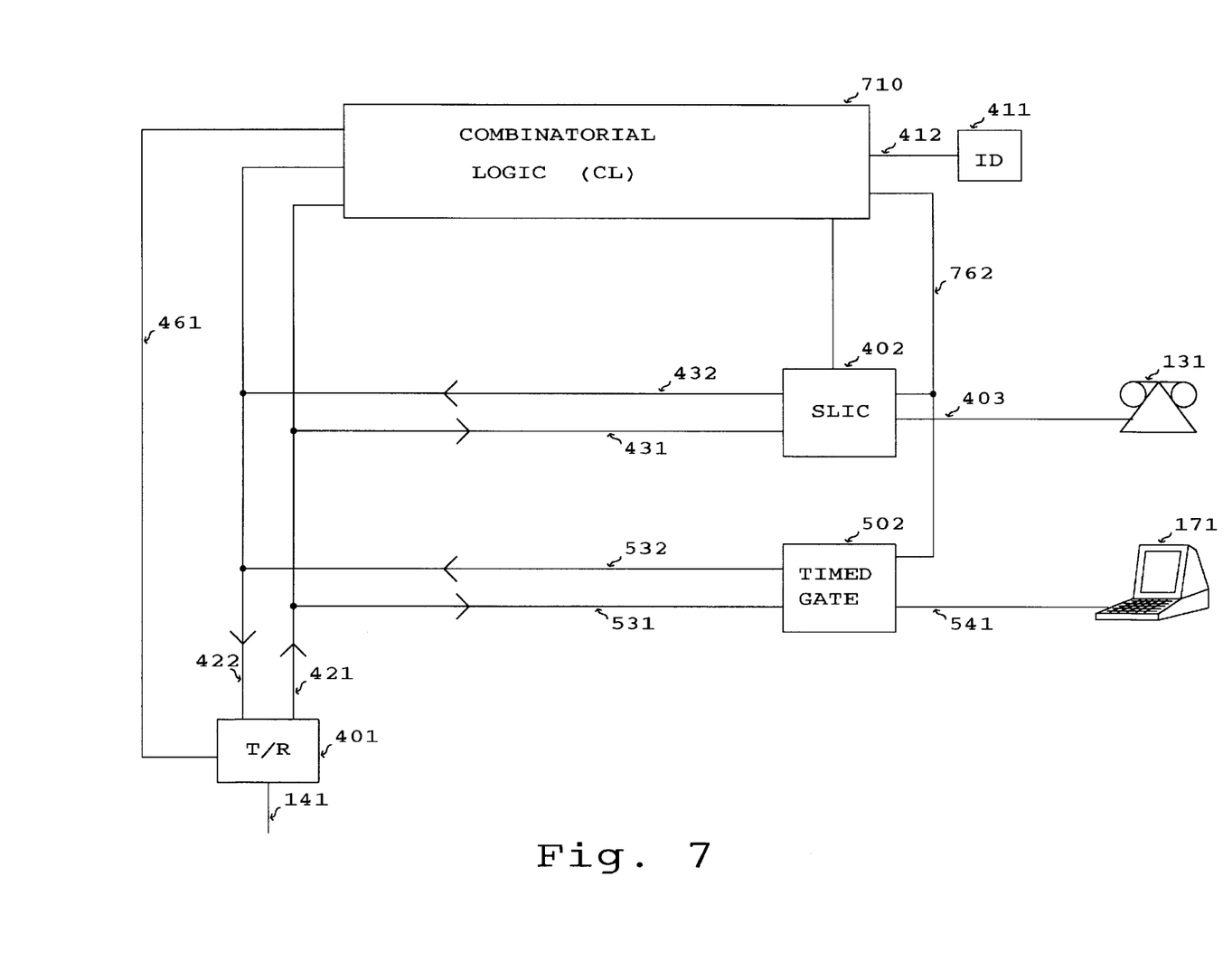
FIG. 7 is a combination of FIGS. 4 and 5 showing the structure of interfacing the System Bus to one voice instrument and one data terminal by sharing the same transceiver T/R.

FIG. 7 is a block diagram consists of combined Station and Terminal Controllers of FIGS. 4 and 5, respectively. Like elements in those figures have the same reference numbers. Since the T/R subsystems 401 and 501 are identical but operated at different times and manners, it would be natural to share the use of it, similar as the way multiple SLICs 601, 602, . . . 608 in FIG. 6 sharing one T/R subsystem 401. Consequently, Combinatorial Logic (CL) 710 should possess combined logic of CL 410 and CL 510 to control SLIC 402 and Timed Gate 502 via command line 762. Thus, FIG. 7 depicts an interface controller that manages a node with Dual (voice and data) local Area Networking (DAN) functionality.

A logical extension of this derivation would lead to the integration of Timed Gate 502 into FIG. 6, resulting in a DAN node capable of supporting multi-line service.

To complete the basic ingredients of a traditional PABX, several operational features are needed. These include Auto-Attendant, Call Transfer, Conference and Intercom. By utilizing the command time slots CMD-P 202 and CMD-S 206 in FIG. 2 and special purpose station instruments, these can be easily implemented:

Let's assume that STN #1 131 is a TAD. Its station controller SC #1 121 would be set up with a special station ID 411, such as "0". And, CL 310 in MC 100 would be programmed to direct all incoming ringing from any one of the telephone lines LA 101, LB 102, . . . LZ 108 by requesting STN "0" to respond which would be SC #1 121. This allows STN #1 131 to greet the callers. The station ID number dialed by the caller is then broadcasted in the command channel CMD-P 202. Any one of the SCs 122, . . . 128 that finds a match to its own ID setting 411 would then respond through command channel CMD-S to receive the call.

Similarly, a call can be transferred between any SCs 121, 122, . . . 128 when a station instrument 131, 132, . . . or 138 dials the desired SC's ID number.

Conferencing is achieved by performing a call transfer but without disconnecting the station instrument after the alerted station answers. Because the speech signals from each talker in a conference are properly spaced in time, each SC participating in a conference would just monitor for all other conference parties' transmission time slots to collect all speech samples, combine them and then send to its telephone instrument. To use the time slots efficiently, the first available Primary time slot is assigned to the external line. The corresponding Secondary time slot is assigned to the first internal party. The second internal party would be assigned the next available Primary time slot, while the third internal party would be using the corresponding Secondary time slot, and so on.

Intercom is established by a station requesting a time slot from MC 100 to be used internally without accessing one of the outside telephone lines LA, LB, . . . LZ. Thus, no DAA module is needed. The initiating SC would be assigned the next available Primary time slot. The first station responding to this intercom call would be assigned the corresponding Secondary time slot. The second station that joins this intercom would be using the next available Primary time slot while the third station that joins this intrcom would be using the corresponding Secondary time slot, and so forth.

For CSMA/CD technology to work efficiently, it needs a continuous block of time as long as possible, to minimize the effects of packet headers and collision delays. On the other hand, using TDMA to represent analog voice introduces a minimum time delay which is in the order of the duration of a frame. Traditional 8 K Frames/s digital multiplex system introduces 125 us delay to the voice which has no discernable effect to human listeners. However, even a full 125 us frame has only a 125 bits block for data transmission at 1 Mb/s of the current HPN line rate which is too short to send a minimum length data packet (512 bits) according to conventional data LAN utilizing CSMA/CD protocol.

It is known that most people can not notice speech echoes shorter than 20 ms or so (Much longer transmission delay can be tolerated because each party does not have instant knowledge about what the remote party is doing.). The current DAN is set up with 80 frames per second repetition rate which results in a System Frame 200 length of 12.5 ms. At 1 Mb/s line rate, this is capable of sending data at 12.5 Kb/Frame. With 3 conversations (384 Kb/s combined digital rate), each frame would be occupied by 4.8 Kb (384 Kb/s divided by 80) of voice and leaving a 7.7 Kb (616 Kb/s divided by 80) block per frame for data traffic. This division of system resources (time) is therefore a realistic starting point for a practical SOHO DAN.

For a given transmission technology (e. g. 1 Mb/s of the current HPN), line rate on System Bus 101' is fixed. Maximum voice pairs "K" in FIG. 2 that is allowed in a DAN system can be preset in Master Controller's CL 310 to set a compromise between voice and data traffic levels. This avoids burdening the installer to make such a decision. A field re-programable option of this parameter would then keep the flexibility open for configurations that a special application may require. On the other hand, with higher line rate, it is possible to speed up the frame rate so that transmission delay for voice can be reduced toward that of the traditional 8 KF/s.

The capabilities of the SCs and TCs, on the other hand, are dtermined by the technology implemented in the transceiver T/R. No parameter need be adjusted by the user.

For simplicity in presentation, telephony voice encoded in 64 Kb/s conventional PCM and carried by currently available 1 Mb/s HPN transmission are employed as an example in the preferred embodiment. It should be apparent to those skilled in the art that the basic system performance can be significantly improved by substituting certain parameters in this system with technologies that are either already available or forthcoming. For example, voice compression techniques, such as ADaptive PCM (ADPCM), have proven to be very effective in sending regular speech at 32 Kb/s and 16 Kb/s. Some systems have even successfully demonstrated ADPCM at 8 Kb/s. Since the digital bit rate of my system is set by the transmission facility utilized, the fewer bits needed for voice transmission, the more bits can be allocated for data application.

On the other hand, if the transmission facility, such as the projected 10 Mb/s or higher HPN technology becomes available, proportionally shorter time would be needed to send the same number of digital bits for each voice channel, there will be more time in each System Frame 200 available for data equipment to send messages, as well.

One handicap of electronic circuitry compared to POTS is that the latter is directly supported from the telephone company's Central Office (CO) which is powered by battery bank. Upon commercial power failure, POTS is expected to continue without interruption. This is essential during emergencies such as natural disaster. Without local power, however, communication through electronic equipments, such as my invention, would become non-operational. Thus, a power fail-safe arrangement with relay 440 and switch 441 is added to the block diagram of SC in FIG. 4. It is energized during normal operation. Upon local power failure, the relay is released to bridge line 403 from STN#1 131 through the normally closed contacts of switch 441 to System Bus 101' via line 141. Since System Bus 101' is already connected to external service line 101 from the telephone company, direct POTS operation is automatically activated.

Because my system could be configured with multiple external service lines 101, 102, . . . 108, it is reasonable to expect that some of them may be accessible at certain SC locations due to existing wiring. This additional telephone service access possibility is shown as line 442 in SC#1 as detailed in FIG. 4 (This is a configuration of telephone station wiring commonly referred to as 2-Line modular jack - RJ14.). When telephone service is available on this additional line, switch 441 should be set at the normally open position. In doing so, the additional telephone line 442 will be utilized by SC #1 for POTS under power failure. This convention would then more evenly distribute traffic load among the external service lines during local power failure.

My invention is a totally modular system consisting of only three types of main modules, MC, SC and TC with industrial standard interface connections. Since SCs and TCs are deployed in multiple units, it is straightforward to replace a malfunctioning module by a spare, or temporarily substitute it by a module from a location of lesser importance. The impact to system operation would be minimal. If DAA module in MC fails, it can be easily replaced by plugging in a spare card of the same type. If MC's main logic 310 fails, the SCs can be powered down to allow the station instruments to operate in POTS mode. The TCs would then run at the full speed of the System Bus capability since there is no Framing signal 201 to restrict their operation intervals.

As can be seen from FIG. 7, the basic function of CL 710 is to manage voice traffic from a station instrument 131 and message flow from a terminal equipment 171. It would be natural to expand the logic in CL 710 and utilize lines 421, 422 to exchange advanced messages with other DAN nodes via T/R 401 to enhance the operation features available to the station instrument 131. For example, one of the data terminals 171, 172, . . . 178 could be a information server that contains databases such as telephone number directory. CL 710 could behave as if it is one of the data terminals to access such information, and then apply the retrieved telephone number to provide "speed dialing" service to its associated station instrument. Similarly, one of the station instruments 131, 132, . . . 138 could be a messaging system that stores messages for all users of the telephone stations. It can be accessed by either making an intercom call to it for retrieving voice message, or contacting it as a data terminal for E-Mails or video clips, etc. This illustrates my invention's architecture, being modular, is very flexible. It can easily support communication enhancements such as the Integration of Computer and Telephony technologies commonly referred to as CTI.

The system architecture of DAN disclosed is also compatible with digital subscriber line products, such as various forms of Digital Subscriber Loop (XDSL) services available from local telephone companies. XDSL utilizes frequencies between POTS and HPN for signal transmission. Therefore, it is compatible, and can easily use a "frequency translation" module to integrate with the DAN system presented here to provide wide area data transmission. This will complete a unified voice and data network that works together for both local and wide area communications, starting from as few as one single pair of telephone wires connecting the telephone CO and a subscriber.

Alternatively, my invention may be employed to establish a stand-alone DAN service. In such a case, a MC with only intercom control logic (without DAAs) is needed to be installed at a convenient location along a single pair of wiring. Then, one station controller is connected to the wiring pair at each location that has the need for voice intercom. Terminal Controllers would still be used for each data equipment as usual.

The forgoing illustrates the principles of the invention and it will thus be appreciated that those skilled in the art will be able to devise alternative arrangements which, although not explicitly described herin, embody the principles of the invention and are within the spirit and scope.

For example, the capacity of this unified system is dependent on the System Bus 101' transmission rate available from the digital multiplexing technology. Currently, the most promising candidate is HPN on telephone line. Its speed of 1 Mb/s is well suited for SOHO environment. With the projected throughput of 10 Mb/s or more, service to an established small business will be possible. Similarly, by dynamically allocating the same communication channel between voice and data applications to share common resources, instead of separate dedicated systems, even high bandwidth facilities such as radio frequency, infrared or coaxial cable based systems can benefit from this system architecture to operate more efficiently.

What is claimed is:

1. A distributed local networking system for managing simultaneous voice traffic and data message among external service lines, local voice station instruments and data terminal equipments comprising, one system bus designed with,
  means to carry a multiplexed signal stream for said local networking system,
one master controller designed with,
  means to interface said external service lines to said system bus,
  means via said system bus, to set system timing reference, to receive request for service, and to issue time slot assignment for said voice traffic as well as to define time interval allocation for said data message,
  means to set up and to transport said voice traffic between said external service lines and said system bus,
one or more station controllers, each designed with,
  means to interface said voice station instrument to said system bus,
  means to monitor said system bus for said system timing reference,
  means via said system bus, to request and receive said time slot assignment,
  means to transport said voice traffic between said voice station instrument and said system bus, within said time slot assignment,
one or more terminal controllers, each designed with,
  means to interface said data terminal equipment to said system bus,
  means to monitor said system bus for said system timing reference, and said time interval allocation,
  means to transport said data message between said data terminal and said system bus, within said time interval allocation,
  wherein,
  said system bus is a shared physical transmission medium among said master, station and terminal controller, and,
  said time slot assignment and said time interval allocation are parts of shared system resources,
provides integrated multi-line voice PABX service to said voice station instruments by means of said master controller, said system bus and said station controllers, as well as data LAN (Local Area Network) service to said data terminal equipments by means of said terminal controllers and said system bus.

2. A distributed local networking system in accordance with claim 1, dynamically manages said system resources by treating said voice traffic with higher priority up to a preset limit and, allocating all remaining said system resources to said data terminal equipments.

3. A distributed local networking system in accordance with claim 1, fully utilizes said system resources by consolidating said time slot assignment not used by voice traffic to one block of contiguous said time interval allocation to improve data networking efficiency.

4. A distributed local networking system in accordance with claim 1, said master, station and terminal controllers are modularly constructed with standard interfaces and fixed operation parameters, offering concise installation, operation and maintenance procedures.

5. A distributed local networking system in accordance with claim 1, operating with simple operation criteria, adapts to individual user's system size and installation configurations.

6. A distributed local networking system in accordance with claim 1, provides simultaneous voice and data networking over the same said shared physical transmission medium.

7. A distributed local networking system in accordance with claim 1, whereby said station controller further comprises bypassing facilities to maintain traffic and distribute load on said external service lines during abnormal operating situations.

8. A distributed local networking system in accordance with claim 1, extends multi-line voice PABX service through said shared physical transmission medium.

9. A distributed local networking system in accordance with claim 1, its performance is only limited by available data compression and line rate technologies.

10. A distributed local networking system in accordance with claim 1, utilizing unified transmission facility for both said voice traffic and said data message conforms with Computer and Telephony Integration (CTI) technology.

11. A distributed local networking system in accordance with claim 1, compatible with WAN (Wide Area Network) transmission technology, provides an unified local and wide area networking for both voice and data communications.

12. A distributed local networking system for managing simultaneous voice traffic and data message among voice station instruments and data terminal equipments comprising, one system bus designed with,
  means to carry a multiplexed signal stream for said local networking system,
one master controller designed with,
  means via said system bus, to set system timing reference, to receive request for service, and to issue time slot assignment for said voice traffic as well as to define time interval allocation for said data message,
one or more station controllers, each designed with,
  means to interface said voice station instrument to said system bus,
  means to monitor said system bus for said system timing reference,
  means via said system bus, to request and receive said time slot assignment,
  means to transport said voice traffic between said voice station instrument and said system bus, within said time slot assignment,
one or more terminal controllers, each designed with,
  means to interface said data terminal equipment to said system bus,
  means to monitor said system bus for said system timing reference, and said time interval allocation,
  means to transport said data message between said data terminal and said system bus, within said time interval allocation,
  wherein,
  said system bus is a shared physical transmission medium among said master, station and terminal controllers, and,
  said time slot assignment and said time interval allocation are parts of shared system resources, provides, in an isolated physical environment, integrated multi-channel voice intercom service to said voice station instruments by means of said system bus and said station controllers, as well as data LAN (Local Area Network) service to said data terminal equipments by means of said terminal controllers and said system bus.

13. A distributed local networking system for managing simultaneous voice traffic and data message among external service lines, local voice station instruments and data terminal equipment, comprising:

utilizing FDM (Frequency Division Multiplexing) as basic signal carrier technique on system bus;

employing CSMA/CD (Carrier Sense Multiple Access with Collision Detection) as information transport protocol;

orchestrating said voice traffic and said data message in TDM (Time Division Multiplexing) formats to satisfy respective transmission criteria, specifically;

assigning time slots to transport said voice traffic from said voice station instrument in TDMA (Time Division Multiple Access) format;

allocating a block of time interval to transport said data message from said data terminal equipment in CSMA/CD format;

employs different transmission technologies into one unified system providing integrated voice and data services.

14. A distributed local networking system in accordance with claim 13, said integration technique maximizes resource allocation and utilization among applications of different characteristics in communication systems with a given channel bandwidth.

15. A method for providing a distributed local networking system for managing simultaneous voice traffic and data message among external service lines, local voice station instruments and data terminal equipments, comprising the steps of:

providing a basic signal carrier technique in the system bus;

initiating an information transport protocol within the system;

orchestrating said voice traffic and data message within said system so as to satisfy respective transmission criteria, specifically, assigning time slots to transport said voice traffic from said voice station instrument in a first format, and allocating a block of time interval to transport said data message from said data terminal equipment in a second format;

employs different transmission technologies into one unified system providing integrated voice and data services.

16. A method as recited in claim 15, wherein said basic signal carrier technique is Frequency Division Multiplexing (FDM).

17. A method as recited in claim 15, wherein said information transport protocol is Carrier Sense Multiple Access with Collision Detection (CSMA/CD).

18. A method as recited in claim 15, wherein said voice traffic and said data message are in Time Division Multiplexing (TDM) format.

19. A method as recited in claim 15, wherein said voice traffic is transported in Time Division Multiple Access (TDMA) format.

20. A distributed local networking system for managing simultaneous voice traffic and data message among voice station instruments and data terminal equipments, comprising:

a plurality of voice stations capable of communicating with each other within a system;

a plurality of data terminal each being associated to a corresponding voice station;

a system bus having a signal carrier technique;

a plurality of station controller interfacing said voice station to said system bus and monitoring said system bus for timing reference;

a plurality of terminal controller for interfacing said data terminal and monitoring said system bus for said system timing reference and a time interval allocation;

initiating an information transport protocol within the system;

orchestrating said voice traffic and said data message within said system so as to satisfy respective transmission criteria, specifically, assigning time slots to transport said voice traffic from said voice station instrument in a first format, and allocating a block of time interval to transport said data message from said data terminal equipment in a second format;

employs different transmission technologies into one unified system providing integrated voice and data services.

\* \* \* \* \*